D. B. HANSON.

DEVICE FOR SIDE DRESSING SAW TEETH.

No. 11,218. Reissued Jan. 19, 1892.

Witness:
James F. Duhamel
Horace A. Dodge

Inventor:
DEMPSEY B. HANSON,
by Dodge & Sons, Attys.

UNITED STATES PATENT OFFICE.

DEMPSEY B. HANSON, OF MILWAUKEE, WISCONSIN.

DEVICE FOR SIDE-DRESSING SAW-TEETH.

SPECIFICATION forming part of Reissued Letters Patent No. 11,218, dated January 19, 1892.

Original No. 447,111, dated February 24, 1891. Application for reissue filed September 3, 1891. Serial No. 404,683.

*To all whom it may concern:*

Be it known that I, DEMPSEY B. HANSON, a citizen of the United States, residing at Milwaukee, in the county of Milwaukee and State of Wisconsin, have invented certain new and useful Improvements in Side-Dressers for Swaged Saw-Teeth, of which the following is a specification, reference being had therein to the accompanying drawings.

My invention relates to devices for dressing the teeth of saws after swaging; and the invention consists in certain peculiar and novel features of construction and arrangement as hereinafter described, and pointed out in the appended claims.

In order that my invention may be fully understood, I will proceed to describe it with reference to the accompanying drawings, in which—

Figure 1:
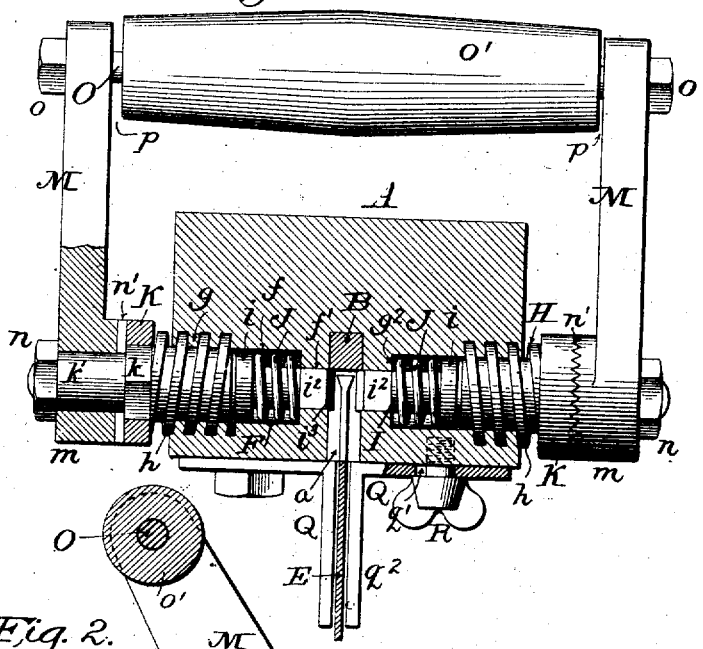
Figure 2:
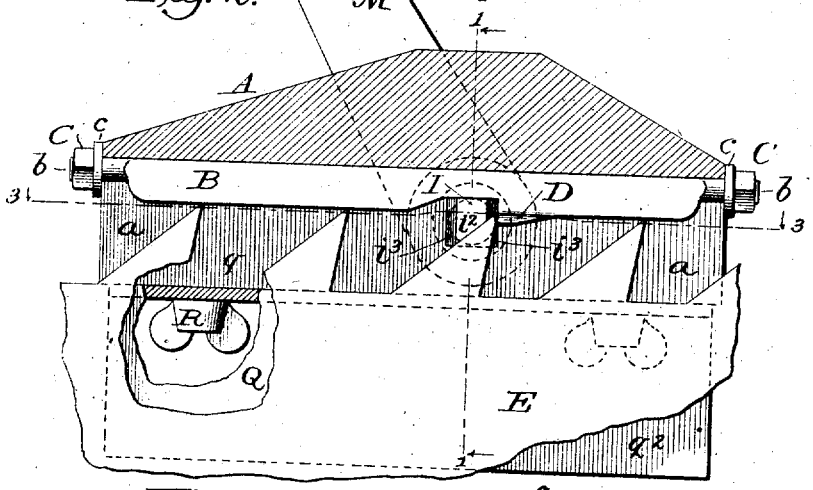
Figure 3:
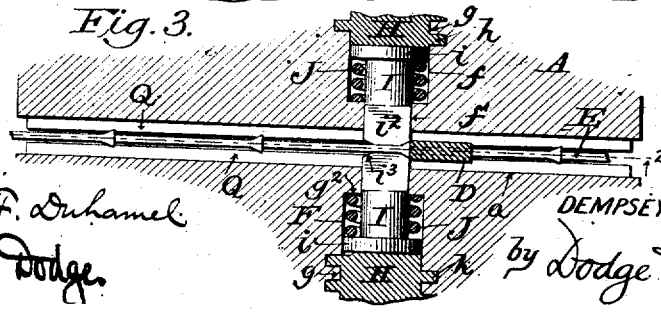

Figure 1 is a transverse vertical section of my improved device on the line 1 1 of Fig. 2. Fig. 2 is a vertical longitudinal section of the same on the line 2 2 of Fig. 3, certain parts being broken away to more clearly illustrate the construction. Fig. 3 is a horizontal cross-section of the same on the line 3 3 of Fig. 2.

The objects of my invention are to produce an instrument which shall accurately and uniformly dress the sides of saw-teeth, so that the saw shall operate with a uniform and rapid cutting action; also, to produce an instrument which can be rapidly adjusted to work upon different gages or widths of saw-teeth, and, finally, to produce a simple and durable instrument which shall be easy to manipulate and rapid and effective in its action. These results I attain by virtue of the construction which I will now proceed to describe.

Referring to the drawings, A designates a block, preferably of metal, which constitutes the body or frame of the machine. In the center of the under side of this block is formed a vertical groove *a*, which extends longitudinally of the block, and the open ends of which terminate at the front and rear sides of said block, as shown in Figs. 2 and 3. Within the upper part of this groove *a* is placed a bar B, which is of such length as to project at its ends *b* beyond the front and rear ends of the block A. These projecting ends *b* are externally screw-threaded to receive nuts C, between which and the adjacent ends of the block A are interposed washers *c*. It will thus be seen that by tightening the nuts C the bar B will be held by endwise pressure within the groove *a*. On its under side the bar B is formed with a downward lug or stop D, the working face of which is of straight vertical form. Against the working face of this stop D the teeth of a saw—such as E—rest when the teeth are being dressed, as hereinafter more fully described, and it will also be seen that by tightening one of the nuts C and loosening the opposite nut the stop-bar B can be varied in longitudinal position within groove *a*, so as to accurately center the saw-teeth relative to the dressing-dies.

Transversely through the block A are formed two cylindrical sockets F, the outer parts *f* of which are of greater diameter than the inner portions *f'*. These channels are in precise axial alignment with each other, and their inner ends open at opposite sides of the groove *a*. The outer ends of the enlarged portions *f* of the sockets F are internally screw-threaded, as shown at *g*, to receive the external screw-threads *h* of the die-forcing screws H. The inner ends of these screws H abut against the outer ends *i* of the dressing-dies I, the latter being separate from said screws and their stems extending outwardly within the enlarged portions *f* of the channels F. The inner portions of the enlarged parts *f* of the sockets F are smooth on their inner surfaces, and the dies are formed with heads *i* to fit closely within these smooth portions of the sockets. Spiral springs J surround the stems of the dies I, and are confined between the heads *i* of the dies and the shoulders $g^2$ at the inner ends of the portions *f* of the sockets. The heads $i^2$ of the dies I work within the reduced portions *f'* of the sockets F, and the inner extremities or faces of these dies are beveled upward and outwardly, as shown at $i^3$, so that when the dies come into contact with the sides of the saw-teeth the latter shall be properly and uniformly dressed on both sides without any possibility of unevenness or irregularity of form.

It is to be understood that this side dressing of the teeth is entirely distinct and different from swaging, and follows the swaging operation performed by a different machine or by hand, the side dressing being designed to bring all the teeth to uniform width or thickness in the swaged portion and to insure proper alignment of the teeth, which are not "set" or "staggered," as in light hand-saws. The swaging action broadens and thickens the point of the tooth; but there is considerable lack of uniformity in the teeth as they come from the swager, and it is to correct this that my device is employed. By reason of the peculiar formation of the dies the beveled portions act upon the points of the teeth, compressing the sides of said points between them until the plain faces or unbeveled portions of the dies come against the unswaged body of the tooth, which acts as a gage to determine the approach of the dies, and consequently the amount of compression and the width and form of the finished point. The angular portions $k$ of the outer ends of the screws H are surrounded by collars K, and the plain cylindrical portions $k'$ of said outer ends are surrounded by the hubs $m$ of two levers M, the said hubs and collars being confined in described position by nuts $n$, which are screwed upon the outer extremities of the die-forcing screws H. The adjacent faces of the collars K and hubs $m$ are serrated, as shown at $n'$, for a purpose to be hereinafter explained.

The levers M are connected at their upper or outer ends by a rod O, which extends loosely through said ends of the levers and which is confined therein by nuts $o$, as shown. Between the levers M the rod O is surrounded by a handle O′, which is necessarily of less length than the minimum space between said levers M, as indicated at $p$.

In order to accurately guide the saw within the groove $a$ and retain it centrally of the width of said groove, I provide two inverted-L-shaped guide-plates Q, each of which corresponds in length with the block A. The upper portion of each of these guide-plates is formed with two or more transverse slots $q'$, through each of which passes a set-nut R, said nuts entering the bottom of the block, and thus confining the guide-plates beneath the same. The lower parts $q^2$ of these guide-plates rest lightly against the sides of the saw, as shown in Fig. 1.

The general operation of the structure above described is as follows: When the teeth of a saw are to be dressed after being swaged, the guides Q are first adjusted toward or away from each other to correspond with the gage or thickness of the saw, this operation being performed by loosening the set-nuts R, moving the guide-plates Q toward or away from each other, as required, and then tightening said set-nuts. The forming-dies $i^2$ are correspondingly adjusted to accord with the desired gage or thickness of the teeth, this being accomplished by loosening the nuts $n$ and moving the collars K the distance of one or more of their teeth $n'$ and then tightening said nuts $n$, the springs J of course keeping the outer ends of the dies always in contact with the inner ends of the forcing-screws. Finally, the stop-bar B is adjusted lengthwise by its nuts C to move the stop D toward or away from the inner ends of the dies to accord with the pitch of the teeth. The machine being thus completely and accurately adjusted to conform with all of the requirements of the saw, the device is placed upon the edge of the saw, so that the point of one of the teeth shall rest against the stop D. The handle O′ is now forced forward, causing the forcing-screws to push the dies against the sides of the teeth. The beveled edges of the dies press the metal uniformly on both sides of the tooth, making a perfectly-true tooth. The handle is now thrown in the opposite direction, causing the screws H to move outward and allowing the springs J to retract the dies. These operations are successively repeated until all of the teeth are properly and uniformly compressed, after which, if necessary, the various parts of the instrument may be readjusted for saws of a different gage from that last operated upon.

It will thus be seen that I have devised an extremely simple and durable saw-dresser, the manipulations of which are easy and rapid and the parts of which can be readily adjusted for all the requirements of side dressing.

It is important that the dies move toward and act upon the tooth from both directions equally, and to insure this result it is necessary that there be a supporting or sustaining frame to hold the blade in a fixed medial position throughout the dressing operation. Without such support or holder or without equal pressure and movement from both sides, the teeth would be irregularly formed and thrown out of alignment, particularly in the event of any irregularity in the previous swaging of the teeth or any lack of uniformity in the temper or hardness of the metal, it being well known that where a body is sustained at one side by a fixed support and receives pressure wholly from the opposite side the compression is greatest on that side against which the moving pressing device bears.

Having thus described my invention, what I claim as new therein, and desire to secure by Letters Patent, is—

1. In a side-dresser, a block or frame, oppositely-moving screws for actuating the dressing-dies, connected levers for revolving the screws, serrated collars on the screws, and serrations on the hubs of the levers for engagement with those of the collars, substantially as set forth.

2. An improved side-dresser comprising a longitudinally-slotted block or frame, a bar secured longitudinally within said slot by end nuts and having on its under side a shoulder or stop to engage the saw-teeth dressing-dies, and means for actuating the same.

3. An improved side-dresser comprising a longitudinally-slotted block or frame having two oppositely-disposed sockets or channels at right angles to the slot and of greater diameter at their outer than at their inner portions, the outer portions of said sockets being internally screw-threaded, oppositely-disposed dies located in the smaller portions of the sockets, spiral retracting-springs surrounding the dies within said smaller portions of the sockets, externally-threaded die-forcing screws located in the larger portions of the sockets, and actuating-levers operatively connected together, substantially as set forth.

4. In a side-dresser, the combination of a block or frame and two dressing-dies mounted and movable therein and arranged to operate upon opposite faces of an interposed saw-tooth, said dies having plain faces to bear against the unswaged faces of the tooth to determine their approach toward each other and being beveled or cut away at their edges to afford space for and give shape to the metal of the swaged portion.

5. In a side-dresser, the combination of a block or frame adapted to hold or sustain a saw-blade, two dressing-dies mounted therein, and means for moving said dies simultaneously against opposite faces of an interposed saw-tooth with sufficient pressure to compress the metal and to bring the tooth to proper width and form.

6. In a side-dresser, the combination of a pair of dies, each die having a plain face and a beveled edge, and means, substantially such as shown and described, for forcing the dies toward each other and against opposite faces of the interposed saw-tooth simultaneously and equally.

7. In a side-dresser, the combination of two dies, each having a plain face arranged to come into contact with the unswaged portion of the interposed saw-tooth and an inclined or beveled portion or face $i^3$ to act upon the previously-swaged portions, and means for bringing the dies against opposite faces of the saw-tooth simultaneously and equally.

8. In a side-dresser, the combination of a slotted block, a pair of dies mounted therein, screws for forcing the dies toward each other, an actuating-lever for each screw, and a handle connecting the levers, the handle being of a length less than the space between the levers.

DEMPSEY B. HANSON.

Witnesses:
FRANK W. GREENLEAF,
THEODORE F. WAMBOLD.